United States Patent [19]

Tiedemann

[11] 4,374,115

[45] Feb. 15, 1983

[54] MAKING CALCIUM HYPOCHLORITE FROM IMPURE LIME

[75] Inventor: Herman H. Tiedemann, Texas City, Tex.

[73] Assignee: Chemetics International Ltd., North York, Canada

[21] Appl. No.: 296,155

[22] Filed: Aug. 25, 1981

[30] Foreign Application Priority Data

Sep. 2, 1980 [CA] Canada .................................. 359437

[51] Int. Cl.³ ............................................. C01B 11/06
[52] U.S. Cl. .................................................... 423/474
[58] Field of Search ................................ 423/473, 474

[56] References Cited

U.S. PATENT DOCUMENTS

| | | | |
|---|---|---|---|
| 1,718,285 | 6/1929 | George | 423/474 |
| 3,872,219 | 3/1975 | Sakowski | 423/474 |
| 4,196,184 | 4/1980 | Sakowski | 423/474 |

*Primary Examiner*—Brian E. Hearn

[57] ABSTRACT

Calcium hypochlorite is made by passing chlorine through an aqueous solution of alkali metal hydroxides containing suspended particles of calcium hydroxide, said alkali metal hydroxides consisting of sodium hydroxide and an hydroxide of an alkali metal having an atomic weight higher than that of sodium.

2 Claims, No Drawings

MAKING CALCIUM HYPOCHLORITE FROM IMPURE LIME

This invention relates to an improvement in the production of calcium hypochlorite.

Calcium hypochlorite is manufactured commercially by passing chlorine through an aqueous solution of sodium hydroxide containing suspended particles of calcium hydroxide. In this process, the calcium hydroxide is chlorinated according to the following well known reactions:

$$2Ca(OH)_2 + 2Cl_2 \rightarrow Ca(OCl)_2 + 2CaCl_2 + 2H_2O$$

$$4NaOH + 2Cl_2 \rightarrow 2NaOCl + 2NaCl + 2H_2O$$

$$CaCl_2 + 2NaOCl \rightarrow Ca(OCl)_2 + 2NaCl$$

which can be summed up in the overall equation $$Ca(OH)_2 + NaOH + 2Cl_2 \rightarrow Ca(OCl)_2 + 2NaCl + 2H_2O$$

It is now well recognized that for the above process to give satisfactory results, the purity of the calcium hydroxide usually fed in the form of lime must generally be in excess of 96%. Indeed as the purity of lime decreases, there results increasing problems in calcium hypochlorite crystal settling and filtration. Larger filter areas with attendant higher capital and operating costs are needed. With increasing filtration problems, more of the mother liquor containing soluble by-product calcium chloride is retained in the wet cake. There results a finished calcium hypochlorite product which is relatively instable due to a substantial amount of calcium chloride being retained therein. Furthermore, larger cake drying capacity is required with still attendant higher capital and operating costs.

It is the principal object of this invention to modify the above conventional process in such a way that the drawbacks due to the impurity of the lime are obviated at least in part. This and other objects of the invention will become further apparent from the following description.

It has indeed been found that the difficulties encountered in the above process as lime purity drops off, e.g. below 96%, are at least partially offset if in addition to the sodium hydroxide there is also present in the reaction medium a minor amount of an hydroxide of an alkali metal having an atomic weight higher than that of sodium.

Thus the invention provides a process for making calcium hypochlorite comprising passing chlorine through an aqueous solution of alkali metal hydroxides containing suspended particles of calcium hydroxide, said alkali metal hydroxides consisting of sodium hydroxide and an hydroxide of an alkali metal having an atomic weight higher than that of sodium.

Among the metals covered in the above statement, potassium is preferred for obvious reasons of availability and economy.

The ratio of sodium hydroxide to the hydroxide of an alkali metal of higher atomic weight in the aqueous solution is preferably such that 75% to 99% of the alkali metal ions in said solution are sodium ions and 1% to 25% are ions of said alkali metal of higher atomic weight than sodium. Most preferred ranges are 92% to 95% and 5% to 8% respectively.

This invention is illustrated by the following example but its scope is not limited to the embodiments shown therein.

EXAMPLE

Several experiments were carried out from samples of lime of three different ranges of purity. For each sample of a given range of purity, at least two runs were made, one run in which sodium hydroxide and potassium hydroxide were used and at least one comparative run in which only sodium hydroxide was used. For all the runs the following procedure was followed.

Into an agitated, cooled reactor, water, calcium hydroxide (lime), sodium hydroxide and in the case of runs 32, 22 and 35 potassium hydroxide were charged and thoroughly mixed and the temperature adjusted to the reaction temperature of 20°–25° C.

In a second agitated vessel a slurry of lime in water was prepared.

The mixture in the reactor had an oxidation-reduction potential of approximately 100 mV. Gaseous chlorine addition to the reactor was then started and the potential increased slowly to 700 mV. At this time addition of lime slurry from the second vessel was started and the potential was maintained at 700–730 mV by controlling the chlorine and lime slurry addition rates. After the supply of lime slurry was exhausted, chlorine addition was continued until completion of the reaction at about 900 mV.

Subsequent solids separation and drying of the finished product were made according to conventional procedures well known by those acquainted with the art.

The characteristics and results of the runs carried out in accordance with the above procedure are shown in the following table.

TABLE

| Run | Lime % Purity | % Na Ions Replaced with K Ions | % Chlorine Activity of Product Ca(OCl)$_2$ | Final Settling Level of Crystals from Reaction Slurry in a 1000 ml Cylinder ml | Filteration |
|---|---|---|---|---|---|
| 32 | 88–90 | 17 | 67 | 800 | Good |
| A* | 88–90 | 0 | Below 60 | 970 | Fluid Filter Cake |
| 22 | 93–95 | 8 | 79 | 520 | Very good |
| 26 | 93–95 | 0 | 77 | 935 | Poor |
| 35 | Above 96 | 8 | 81 | Below 400 | Excellent |
| 36 | Above 96 | 0 | 80 | 500 | Very good |

*A - is average of several comparative runs

I claim:

1. A process for making calcium hypochlorite comprising passing chlorine through an aqueous solution of alkali metal hydroxides containing suspended particles of calcium hydroxide, said alkali metal hydroxides consisting of sodium hydroxide and potassium hydroxide wherein the ratio of sodium hydroxide to potassium hydroxide in the aqueous solution is such that 75% to 99% of the alkali metal ions in said solution are sodium ions and 1% to 25% are potassium ions, and wherein the calcium hydroxide is less than 96% pure.

2. A process as claimed in claim 1 wherein the ratio of sodium hydroxide to potassium hydroxide in the aqueous solution is such that 92% to 95% of the alkali metal ions in said solution are sodium ions and that 5% to 8% are potassium ions.

* * * * *